United States Patent
Ohba (10) Patent No.: US 10,845,185 B2
(45) Date of Patent: Nov. 24, 2020

(54) MEASURING APPARATUS AND METHOD FOR MEASURING FILM THICKNESS USING RELATIVE HEIGHTS IN COMBINATION WITH REFRACTIVE INDEX

(71) Applicant: NTN Corporation, Osaka (JP)

(72) Inventor: Hiroaki Ohba, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/473,600

(22) PCT Filed: Nov. 28, 2017

(86) PCT No.: PCT/JP2017/042589
§ 371 (c)(1),
(2) Date: Jun. 25, 2019

(87) PCT Pub. No.: WO2018/123398
PCT Pub. Date: Jul. 5, 2018

(65) Prior Publication Data
US 2019/0339060 A1    Nov. 7, 2019

(30) Foreign Application Priority Data
Dec. 27, 2016   (JP) ................. 2016-253901

(51) Int. Cl.
*G01B 11/06*  (2006.01)
*B05C 5/02*  (2006.01)
(Continued)

(52) U.S. Cl.
CPC ............ *G01B 11/0675* (2013.01); *B05C 5/02* (2013.01); *B05C 11/00* (2013.01); *G01N 21/45* (2013.01)

(58) Field of Classification Search
CPC ....... G01B 11/0675; G01B 11/06; B05C 5/02; B05C 11/00; B05C 1/02; B05C 5/00; G01N 21/45
See application file for complete search history.

(56) References Cited

U.S. PATENT DOCUMENTS 5,129,724 A    7/1992  Brophy et al.
10,480,997 B1 * 11/2019  Shinke .............. G01B 11/0675
(Continued)

FOREIGN PATENT DOCUMENTS

JP    H8210818 A     8/1996
JP    2007-268354 A  10/2007
(Continued)

OTHER PUBLICATIONS

International Search Report issued in corresponding International Application No. PCT/JP2017/042589, dated Feb. 13, 2018, with English translation.
(Continued)

*Primary Examiner* — Michael P LaPage
(74) *Attorney, Agent, or Firm* — McDermott Will & Emery LLP (57) ABSTRACT

There is provided a method of measuring a film thickness of a transparent material on a substrate. A first object (transparent material) is applied onto a first substrate surface, and a second object (transparent material) is applied onto a second substrate surface. The method includes: measuring a first relative height of a front surface of the first object with respect to the first substrate surface at a position without the first object; measuring a second relative height of the front surface with respect to a back surface of the first object; and calculating a refractive index of the transparent material, based on the first relative height and the second relative height. The method includes measuring a film thickness of the second object, using a third relative height of a front (Continued)

surface of the second object with respect to a back surface of the second object and the calculated refractive index.

9 Claims, 10 Drawing Sheets

(51) Int. Cl.
  *B05C 11/00* (2006.01)
  *G01N 21/45* (2006.01)

(56) References Cited

U.S. PATENT DOCUMENTS

| | | | |
|---|---|---|---|
| 2005/0073692 A1* | 4/2005 | De Groot | G01B 9/02084 |
| | | | 356/497 |
| 2006/0152734 A1* | 7/2006 | Suzuki | G01B 11/0675 |
| | | | 356/479 |
| 2008/0180685 A1 | 7/2008 | De Lega et al. | |
| 2009/0296099 A1 | 12/2009 | Burger et al. | |
| 2010/0007894 A1* | 1/2010 | Suehira | G01B 11/0625 |
| | | | 356/497 |
| 2010/0277745 A1 | 11/2010 | Pahk et al. | |
| 2012/0044501 A1* | 2/2012 | Oikaze | G01B 9/02088 |
| | | | 356/503 |
| 2016/0272933 A1* | 9/2016 | Larimer | C12M 41/48 |
| 2019/0265023 A1* | 8/2019 | Deck | G01B 9/02072 |

FOREIGN PATENT DOCUMENTS

| | | |
|---|---|---|
| JP | 2008-286630 A | 11/2008 |
| JP | 2008-292296 A | 12/2008 |
| JP | 2009-509149 A | 3/2009 |
| JP | 2009-122259 A | 6/2009 |
| JP | 2009-237086 A | 10/2009 |
| JP | 2011-506996 A | 3/2011 |
| JP | 2015-178980 A | 10/2015 |
| JP | 2016-038284 A | 3/2016 |
| WO | 2010/066949 A1 | 6/2010 |
| WO | 2016/204062 A1 | 12/2016 |

OTHER PUBLICATIONS

Office Action issued in corresponding Japanese Application No. 2016-253901, dated Apr. 3, 2018, with English translation.
Katsuichi Kitagawa, "Thin Film Thickness Profile Measurement Using an Interferometric Surface Profiler", Optomechatronic Sensors and Instrumentation III, Proceedings of SPIE, vol. 6716, Oct. 8, 2007, pp. -671607-1-671607-12.
Extended European Search Report issued in corresponding European Patent Application No. 17885880.9, dated Jul. 27, 2020.

* cited by examiner

FIG.12

MEASURING APPARATUS AND METHOD FOR MEASURING FILM THICKNESS USING RELATIVE HEIGHTS IN COMBINATION WITH REFRACTIVE INDEX

CROSS-REFERENCE TO RELATED APPLICATIONS

This application is the U.S. National Phase under 35 U.S.C. § 371 of International Application No. PCT/JP2017/042589, filed on Nov. 28, 2017, which claims the benefit of Japanese Application No. 2016-253901, filed on Dec. 27, 2016, the entire contents of each are hereby incorporated by reference.

TECHNICAL FIELD

The present invention relates to a measuring apparatus, an application apparatus and a method of measuring a film thickness, and more particularly to a technique for detecting a film thickness of an applied transparent material.

BACKGROUND ART

There are known techniques for performing accurate processing and correction of a microscopic pattern by using an application needle having a tip diameter of several tens of micrometers and a laser beam having a spot diameter of several micrometers to several tens of micrometers (PTLs 1 to 3). Among these, the processing technique using the application needle makes it possible to apply a material having a relatively high viscosity. Therefore, the processing technique using the application needle is also used to form a relatively thick film of not less than 10 μm in order to form an electronic circuit pattern and the like of a semiconductor device such as, for example, an MEMS (Micro Electro Mechanical Systems) and a sensor.

In addition, in recent years, a wiring pattern of an electronic component has become increasingly finer, and such processing technique has also been applied to the fields that require a higher degree of reliability, and it has been desired to check a film thickness and a volume of an applied material.

Citation List

PATENT LITERATURE

PTL 1: Japanese Patent Laying-Open No. 2007-268354
PTL 2: Japanese Patent Laying-Open No. 2009-122259
PTL 3: Japanese Patent Laying-Open No. 2009-237086
PTL 4: Japanese Patent Laying-Open No. 2008-286630

SUMMARY OF INVENTION

Technical Problem

A detection method using white-light interferometry as described in Japanese Patent Laying-Open No. 2008-286630 (PTL 4) is known as a method of detecting a film thickness of a transparent material. The white-light interferometry is a detection method of using a white-light interferometer to observe interference light based on light reflected from a front surface of a transparent material and interference light based on light reflected from a back surface of the transparent material, and based on a distance between peaks of an interference light intensity of each interference light (measurement film thickness t') and a refractive index (n) of the transparent material, calculate an actual film thickness (t) in accordance with the following formula (1):

$$t = t'/n \quad (1).$$

In the method described in PTL 4, refractive index n of the material needs to be preliminarily known. Therefore, it is necessary to preliminarily ask a manufacturer of the used material about the refractive index, or to prepare a separate apparatus for measuring the refractive index.

In addition, when a plurality of materials are mixed and used, it is concerned that the refractive index varies depending on a difference in a mixing ratio. The refractive index may also vary with a change in usage environment such as temperature and humidity. Therefore, in order to detect the film thickness accurately and at high speed, it is necessary to obtain the refractive index in a condition close to the actual film thickness measurement.

The present invention has been made to solve the above-described problem, and an object thereof is to measure a film thickness of an applied transparent material at high speed and with a high degree of precision.

Solution to Problem

A measuring apparatus according to the present invention is configured to measure a film thickness of an object of a transparent material applied onto a substrate surface. The measuring apparatus includes: a light source configured to emit white light; an objective lens; an imaging device; a positioning device; and a control device. The objective lens is configured to separate the white light emitted from the light source into two beams, irradiate the object with one of the two beams and irradiate a reference surface with the other beam, and cause interference between light reflected from the object and light reflected from the reference surface, to thereby obtain interference light. The imaging device is configured to take an image of the interference light obtained by the objective lens. The positioning device is configured to move the objective lens in an optical axis direction relative to the object. The control device is configured to control the light source, the imaging device and the positioning device, and measure a height of the object based on a peak intensity of the interference light in the image taken by the imaging device. A first object is applied onto a first substrate surface, and a second object is applied onto a second substrate surface. The control device is configured to calculate a refractive index of the transparent material, based on a first relative height of a front surface of the first object with respect to the first substrate surface at a position where the first object is not applied and a second relative height of the front surface of the first object with respect to a back surface of the first object. The control device is configured to measure a film thickness of the second object, using a third relative height of a front surface of the second object with respect to a back surface of the second object and the calculated refractive index.

Preferably, the first substrate surface and the second substrate surface are on different substrates.

Preferably, the first substrate surface and the second substrate surface are on the same substrate.

An application apparatus according to the present invention includes: an application mechanism configured to apply the transparent material onto the substrate surface; and the above-described measuring apparatus.

Preferably, the application mechanism includes an application needle. The transparent material adheres to a tip portion of the application needle. The tip portion of the application needle or the transparent material adhering to the tip portion of the application needle is brought into contact with the substrate surface, to thereby apply the transparent material onto the substrate surface.

Preferably, the control device is configured, after the transparent material is applied onto the second substrate surface by the application mechanism, to measure the film thickness of the second object, with the substrate remaining fixed.

The present invention is directed to a method of measuring a film thickness of an object of a transparent material applied onto a substrate surface. A first object is applied onto a first substrate surface, and a second object is applied onto a second substrate surface. The method includes: measuring a first relative height of a front surface of the first object with respect to the first substrate surface at a position where the first object is not applied; measuring a second relative height of the front surface of the first object with respect to a back surface of the first object; calculating a refractive index of the transparent material, based on the first relative height and the second relative height; and measuring a film thickness of the second object, using a third relative height of a front surface of the second object with respect to a back surface of the second object and the calculated refractive index.

Preferably, the first to third relative heights are measured using white-light interferometry.

Advantageous Effects of Invention

According to the present invention, the film thickness of the transparent material applied onto the substrate surface can be measured at high speed and with a high degree of precision.

DESCRIPTION OF EMBODIMENTS

An embodiment of the present invention will be described hereinafter with reference to the drawings.

[Overall Configuration]

Figure 1:
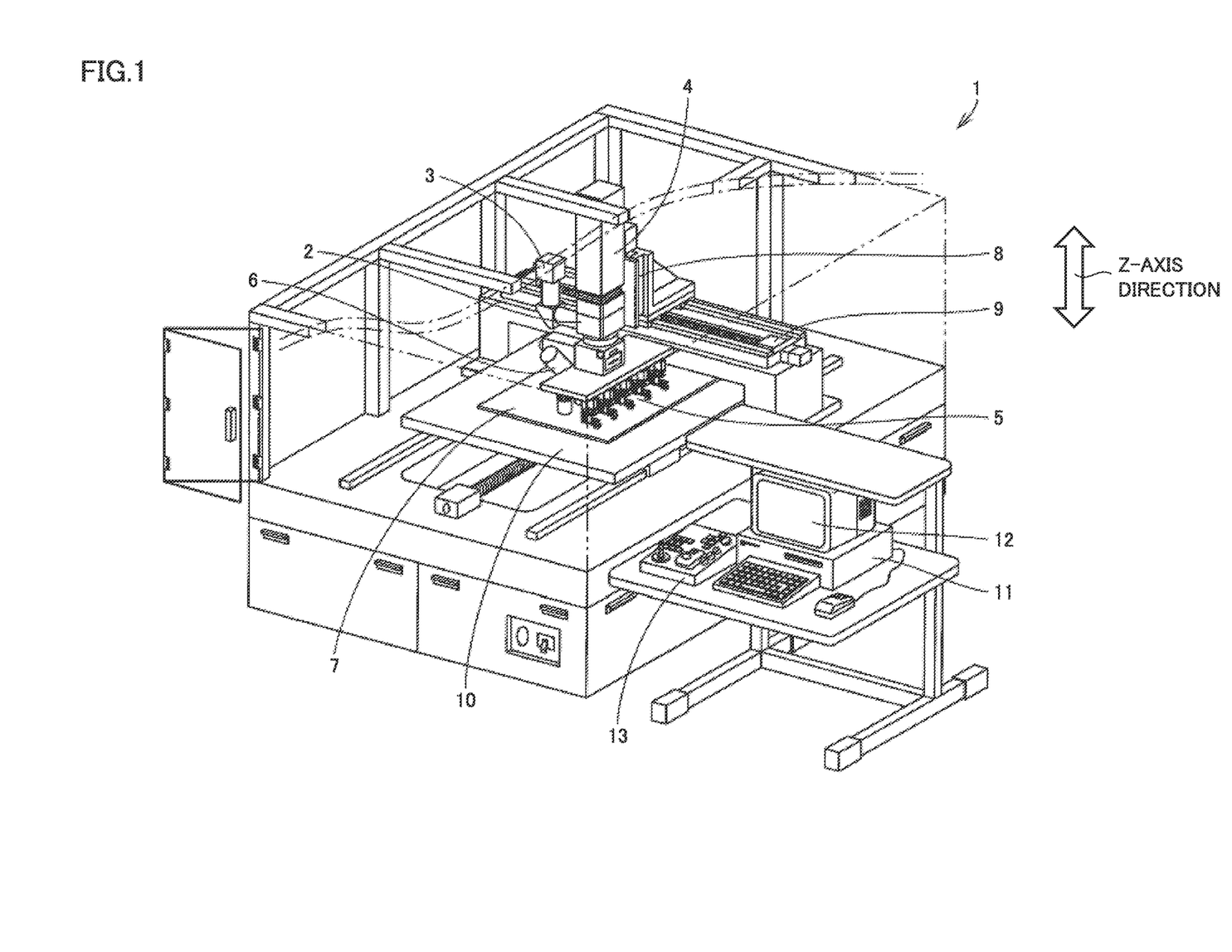
FIG. 1 is a perspective view showing an overall configuration of a microscopic application apparatus including the function of measuring a film thickness as a typical example of the present embodiment.

FIG. 1 is a perspective view showing an overall configuration of a microscopic application apparatus 1 including the function of measuring a film thickness as a typical example of an embodiment of the present invention.

Referring to FIG. 1, microscopic application apparatus 1 includes: an application head portion composed of an observation optical system 2, a CCD (Charge-Coupled Device) camera 3, a cutting laser device 4, an application mechanism 5, and a light source for curing 6; a Z stage 8 configured to move the application head portion in a vertical direction (Z-axis direction) with respect to a substrate 7 to be coated; an X stage 9 configured to have Z stage 8 mounted thereon and move Z stage 8 in an X-axis direction; a Y stage 10 configured to have substrate 7 mounted thereon and move substrate 7 in a Y-axis direction; a control computer 11 configured to control the total operation of microscopic application apparatus 1; a monitor 12 configured to display an image and the like taken by CCD camera 3; and an operation panel 13 through which a command from an operator is input to control computer 11.

Observation optical system 2 includes a light source for lighting and observes a surface state of substrate 7 and a state of a transparent material applied by application mechanism 5. An image observed by observation optical system 2 is converted to an electric signal by CCD camera 3 and displayed on monitor 12. Cutting laser device 4 irradiates substrate 7 with a laser beam through observation optical system 2 to remove a metal film and the like.

Application mechanism 5 forms the transparent material such as, for example, an adhesive on substrate 7. Light source for curing 6 includes, for example, a $CO_2$ laser and irradiates the transparent material applied by application mechanism 5 with a laser beam to cure the transparent material.

The configuration of microscopic application apparatus 1 is one example, and microscopic application apparatus 1 may have, for example, a configuration called "gantry style" in which Z stage 8 having observation optical system 2 and the like mounted thereon is mounted on X stage 9 and further X stage 9 is mounted on Y stage 10 and Z stage 8 is movable in an X-Y direction. Microscopic application apparatus 1 may have any configuration as long as Z stage 8 having observation optical system 2 and the like mounted thereon is movable in the X-Y direction relative to substrate 7.

Figure 2:
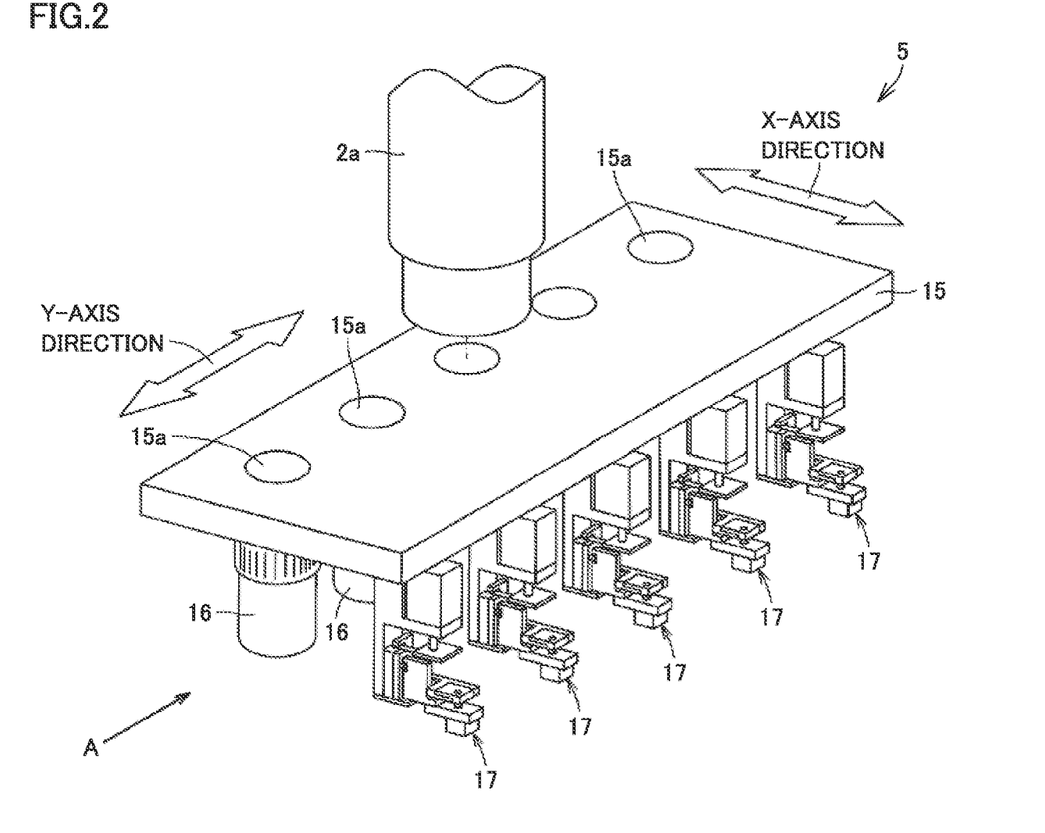
FIG. 2 is a perspective view showing a main portion of an observation optical system and an application mechanism.

Next, an example of application mechanism 5 including a plurality of application needles 18 will be described. FIG. 2 is a perspective view showing a main portion of observation optical system 2 and application mechanism 5. Referring to FIG. 2, observation optical system 2 and application mechanism 5 include a movable plate 15, a plurality of (e.g., five) objective lenses 16 having different magnifications, and a plurality of (e.g., five) application units 17 for applying different types of transparent materials.

Movable plate 15 is provided so as to be movable in the X-axis direction and in the Y-axis direction between a lower end of an observation lens barrel 2a of observation optical system 2 and substrate 7. In addition, five through holes 15a corresponding to five objective lenses 16, respectively, are formed in movable plate 15.

Five through holes 15a are fixed to a lower surface of movable plate 15 at prescribed intervals in the Y-axis direction. Five application units 17 are arranged so as to be adjacent to five objective lenses 16, respectively. By moving movable plate 15, desired application unit 17 can be arranged above an application position.

Figure 3:
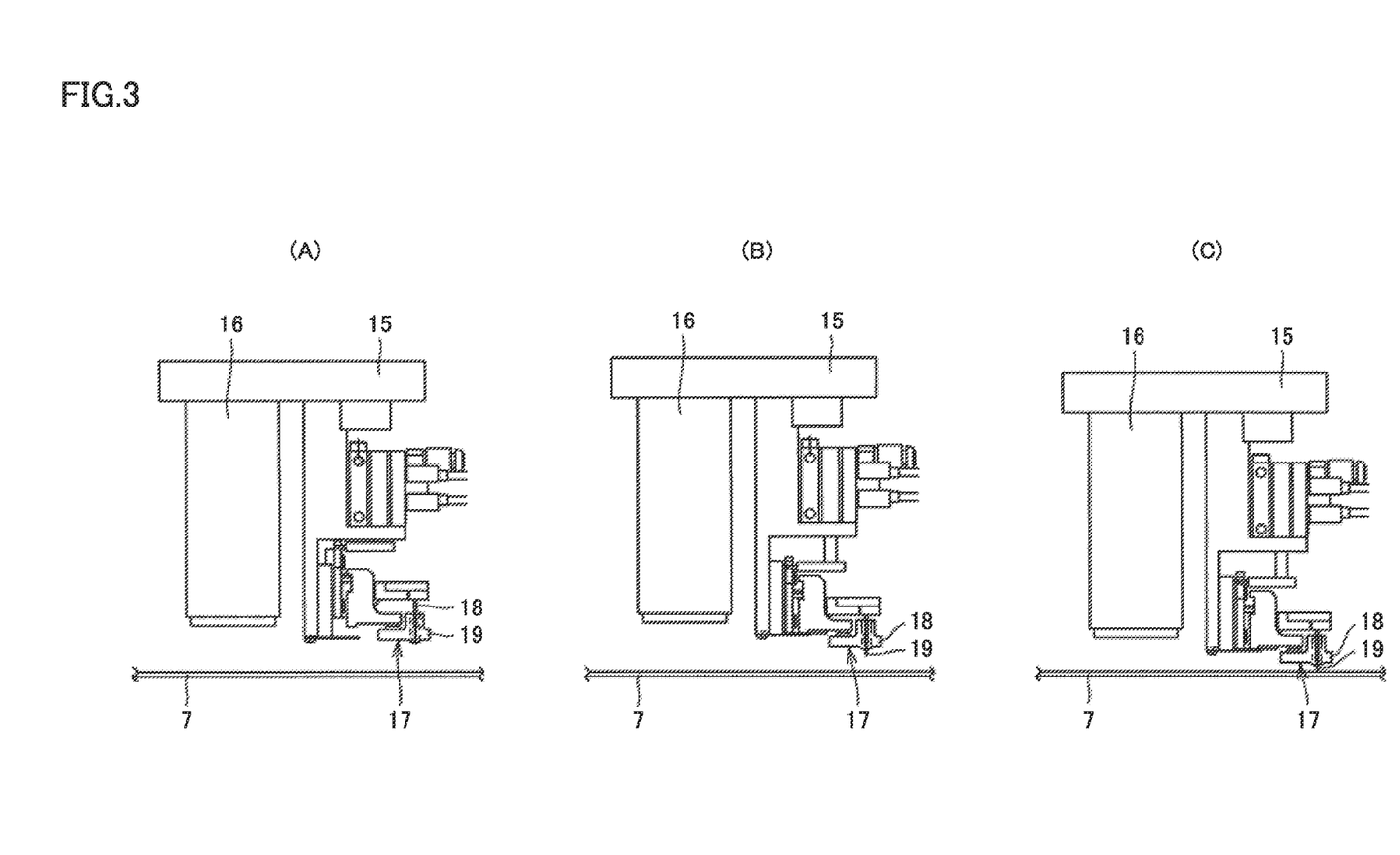
FIGS. 3(A) to (C) show the main portion when viewed from an A direction in FIG. 2.

FIGS. 3(A) to (C) show the main portion when viewed from an A direction in FIG. 2, and show the transparent material application operation.

Application unit 17 includes application needle 18 and a tank 19.

First, as shown in FIG. 3(A), application needle 18 of desired application unit 17 is positioned above the application position. At this time, a tip portion of application needle 18 is immersed in the transparent material in tank 19.

Next, as shown in FIG. 3(B), application needle 18 is moved down, such that the tip portion of application needle 18 protrudes from a hole of a bottom of tank 19. At this time, the tip portion of application needle 18 has the transparent material adhering thereto.

Next, as shown in FIG. 3(C), application needle 18 and tank 19 are moved down to bring the tip portion of application needle 18 into contact with the application position, and the transparent material is thereby applied. Thereafter, the main portion returns to the state shown in FIG. 3(A).

In addition to the foregoing, various techniques of application mechanism 5 including the plurality of application needles 18 are known, and thus, a detailed description will not be repeated. These techniques are described in, for example, PTL 2 (Japanese Patent Laying-Open No. 2009-122259) and the like. Microscopic application apparatus 1 can apply a desired transparent material of the plurality of transparent materials by using, for example, the mechanism shown in FIG. 2 as application mechanism 5, and can apply the transparent material by using application needle 18 having a desired application diameter, of the plurality of application needles 18.

The present embodiment is described in connection with the example in which the function of measuring a film thickness is integrally incorporated into the microscopic application apparatus including application mechanism 5 provided with application needles 18. However, other mechanisms such as, for example, an ink jet and a dispenser may also be used as a mechanism for applying a material.

[Principle of Measuring Film Thickness]

Next, the principle of measuring the film thickness of the transparent material using the white-light interferometry will be described.

Figure 4:
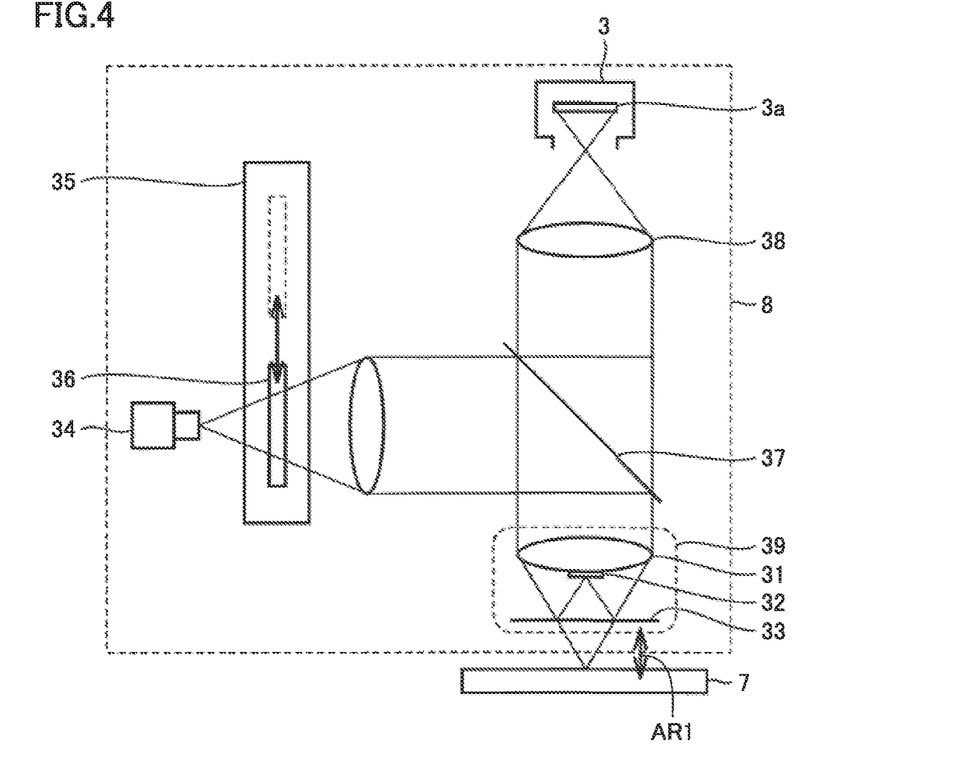
FIG. 4 is an arrangement diagram of optical elements of the observation optical system.

FIG. 4 is an arrangement diagram of optical elements of observation optical system 2. Observation optical system 2 includes an incident light source 34, a filter switching device 35, a half mirror 37, an image-forming lens 38, and a Mirau-type interference objective lens 39. Mirau-type interference objective lens 39 includes a lens 31, a reference mirror 32 and a beam splitter 33.

Mirau-type interference objective lens 39 is one type of two-beam interference objective lens. By utilizing the characteristic that the interference light intensity is maximized at a focal position of Mirau-type interference objective lens 39, an image of the interference light is obtained, with Z stage 8 being moved in the Z-axis direction relative to substrate 7. For each pixel of a plurality of images, a position of Z stage 8 in the Z-axis direction where the interference light intensity is maximized is determined, to thereby detect a height (z coordinate) of a front surface and a back surface of the transparent material and a substrate surface. This method of measuring the height is suitable for detecting a micro height of not more than several micrometers. The back surface of the transparent material refers to a boundary surface between the transparent material and the liquid material, and refers to a substrate surface at a location where the transparent material is applied, to put it another way.

Mirau-type interference objective lens 39 separates the white light emitted from the light source for lighting included in observation optical system 2 into two beams, and irradiates a surface of an object with one of the two beams and irradiates a reference surface with the other beam, to thereby cause the light reflected from the surface of the object and the light reflected from the reference surface to interfere with each other.

A white light source is used as the light source for lighting included in observation optical system 2. In the case of using the white light source, the interference light intensity is maximized only at a focal position of Mirau-type interference objective lens 39, unlike the case of using a single wavelength light source such as a laser. Therefore, the white light source is suitable for measuring a height of the transparent material.

A filter 36 is provided in an emission portion of incident light source 34 by a filter switching device 35.

When the light emitted from incident light source 34 passes through filter 36, the white light having a center wavelength of $\lambda$ (nm) is obtained.

The light having passed through filter 36 is reflected in a direction of lens 31 by a half mirror 37. The light having entered lens 31 is divided by beam splitter 33 into the light passing in a direction of substrate 7 and the light reflected in a direction of reference mirror 32. The light reflected from a surface of substrate 7 and the light reflected from a surface of reference mirror 32 join again in beam splitter 33 and are gathered by lens 31. Thereafter, the light having exited from lens 31 passes through half mirror 37, and then, enters an imaging surface 3a of CCD camera 3 through an image-forming lens 38.

Normally, Mirau-type interference objective lens 39 is moved in an optical axis direction using Z stage 8, to thereby generate an optical path length difference between the light reflected from the surface of substrate 7 and the light reflected from the surface of reference mirror 32. Then, an image of the interference light generated due to the above-described optical path length difference is picked up by CCD camera 3, with Mirau-type interference objective lens 39 being moved by Z stage 8. The intensity of this interference light, i.e., brightness is maximized when the optical path length of the light reflected from substrate 7 is equal to the optical path length of the light reflected from reference mirror 32. In addition, focusing is obtained on the surface of substrate 7 at this time.

In addition to Z stage 8, substrate 7 itself may be moved up and down using the table, or a piezo stage may be attached to a coupling portion of Mirau-type interference objective lens 16 and observation optical system 2 to thereby move up and down the position of Mirau-type interference objective lens 39.

Although the Mirau-type interference objective lens is used in the present embodiment, a Michelson-type or Riniku-type interference objective lens may be used.

Figure 5:
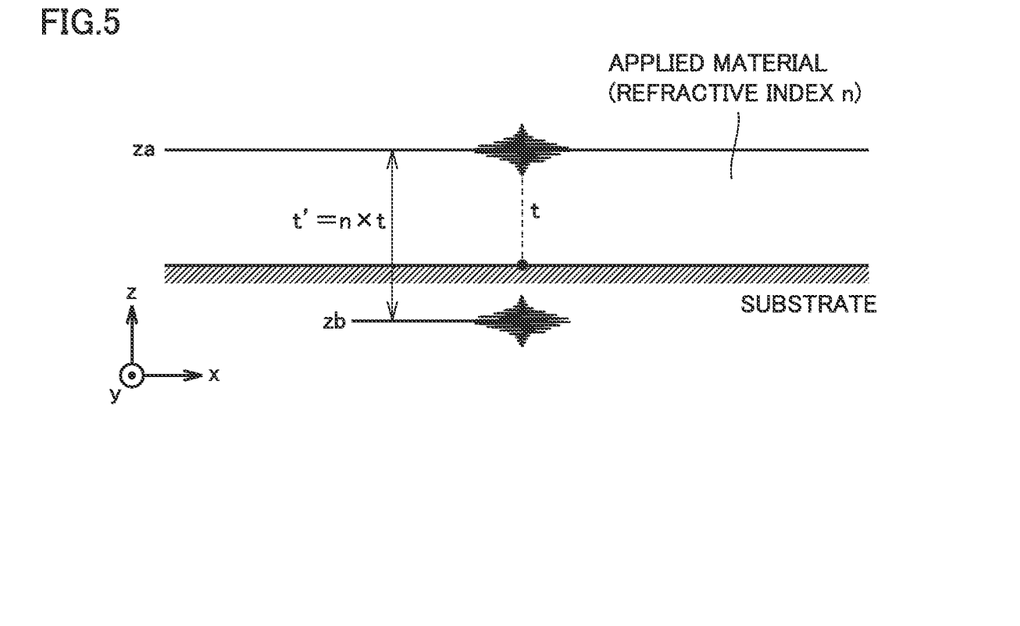
FIG. 5 is a diagram for illustrating a principle of measuring the film thickness using the white-light interferometry.

When Mirau-type interference objective lens 39 is moved in the optical axis direction for scanning in a case where the transparent material having refractive index n is applied onto the substrate as shown in FIG. 5, focusing is obtained on a front surface and a back surface of the applied transparent material, and thus, two peaks of the interference light intensity appear.

Let us consider the case in which Za represents a position of Z stage 8 where the peak of the interference light intensity corresponding to the front surface of the transparent material appears, and Zb represents a position of Z stage 8 where the peak of the interference light intensity corresponding to the back surface appears. In this case, an apparent film thickness calculated from the measurement positions of the two peaks is expressed by $t'=|za-zb|$.

A distance of travel of the light passing through a material having refractive index n and film thickness t is expressed by $n \times t$. Therefore, when the film thickness calculated from the measurement positions of the two peaks is $t'$, the relation of $t'=n \times t$ is satisfied between them. Thus, actual film thickness t of the transparent material can be calculated in accordance with the following formula (2):

$$t=t'/n=|za-zb|/n \qquad (2).$$

[Measurement of Film Thickness of Transparent Material in the Present Embodiment]

(Problem in Film Thickness Measurement)

In measurement of the film thickness of the transparent material using the white-light interferometry, the information about the refractive index of the transparent material to be measured is required as described in the formula (2) above. If the refractive index of the transparent material is known and non-changing, the correct film thickness can be calculated by storing the refractive index as a constant.

However, when a plurality of materials are, for example, mixed to obtain an applied material, the refractive index may vary depending on a mixing ratio of the materials. Even when one type of material is used, the refractive index may vary to a certain degree, depending on a usage environment such as temperature and humidity, a change over time, and the like. Particularly, when measurement of micrometer order is performed, it is concerned that a difference between the refractive index used for calculation and the actual refractive index affects the accuracy of film thickness measurement even if the difference is very small.

Thus, the present embodiment adopts a method of measuring and storing a refractive index of one of the actually-applied transparent materials, and measuring film thicknesses of the remaining transparent materials by using the stored refractive index. For example, in the case of a substrate onto which a plurality of transparent materials are applied, measurement of the refractive index may be performed at the start of measurement of the substrate, or may be performed at the time of measurement of an initial substrate in the same lot. When the same material is continuously used, measurement may be performed at the start of operation every day or at prescribed time intervals. As described above, the refractive index of the applied material is actually measured and the film thicknesses of the other objects to be measured are measured by using the measured refractive index. Therefore, a change in refractive index can be reflected in measurement, and thus, the accuracy of film thickness measurement can be enhanced.

In addition, the film thicknesses of a plurality of objects to be measured are measured by using the result of one measurement of the refractive index. Therefore, the measurement time can be reduced and measurement can be performed at high speed, as compared with the case of measuring the refractive index for each object to be measured.

(Measurement of Refractive Index)

Figure 6:
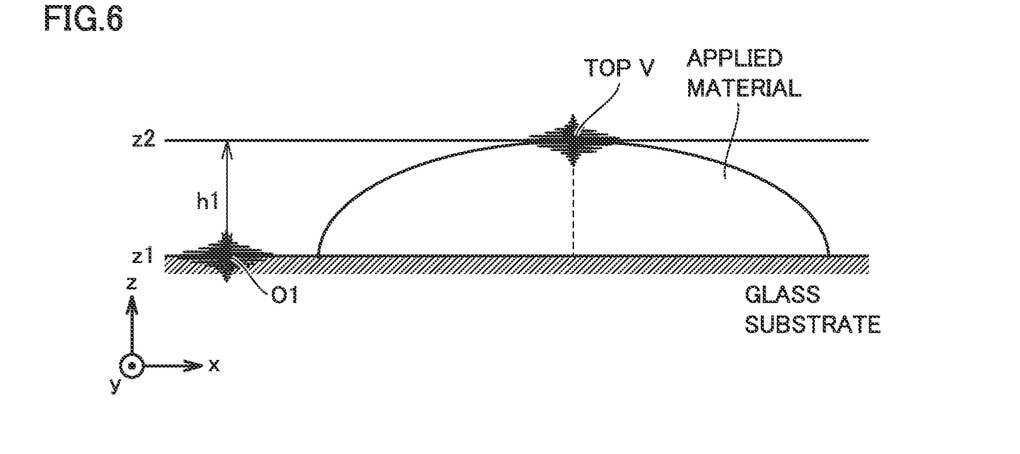
FIG. 6 is a first diagram for illustrating a method of measuring a refractive index of a transparent material.
Figure 7:
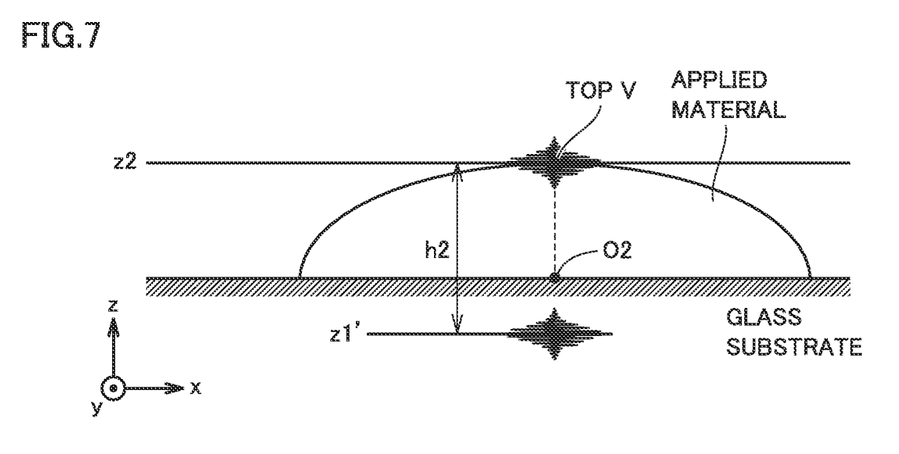
FIG. 7 is a second diagram for illustrating the method of measuring the refractive index of the transparent material.

Next, a method of measuring the refractive index will be described with reference to FIGS. 6 and 7. FIGS. 6 and 7 are described in connection with the case of applying the transparent material onto a test substrate designed specifically for measurement of the refractive index to measure the refractive index. However, the refractive index may be measured by using the same method for one of the transparent materials applied onto an actual product.

Referring to FIG. 6, first, a test glass substrate onto which a transparent material is applied is placed on Y stage 10. Then, a height z1 of the glass substrate at a position O1 where the transparent material is not applied is measured based on a peak position of interference light. Next, a height z2 at a top V of the applied transparent material (front surface of the applied material) is measured based on the peak position of the interference light. At position O1, the refractive index of the transparent material has no influence, and thus, a difference between the measured two positions, i.e., a relative height of top V with respect to the actual substrate surface corresponds to an actual height h1 of top V of the applied material.

$$h1=|z2-z1| \qquad (3)$$

Next, as shown in FIG. 7, a height z1' of a glass substrate position O2 measured through the transparent material at the position of top V described above (i.e., height of a back surface of the transparent material) is measured. In measurement in this case, the refractive index of the transparent material has an influence, and thus, the height at which the peak of the interference light occurs is apparently lower than (on the negative side of the z axis) the height of the actual substrate surface. Therefore, a relative height h2 of the front surface (top V) with respect to the back surface of the transparent material is expressed by the following formula (4):

$$h2=|z2-z1'| \qquad (4).$$

Since the relation of the formula (1) above is satisfied between relative heights h1 and h2, refractive index n of the transparent material can be calculated in accordance with the following formula (5):

$$n=h2/h1=|z2-z1'|/|z2-z1| \qquad (5).$$

Although the refractive index is calculated based on measurement at the position of top V of the applied material in the foregoing description, the position of measurement is not limited thereto. Measurement may be performed at any position on the front surface of the applied material. In addition, measurement is not limited to measurement at one point, and an average value may, for example, be calculated based on the result of measurement at a plurality of positions.

(Check of Application Film Thickness)

Figure 8:
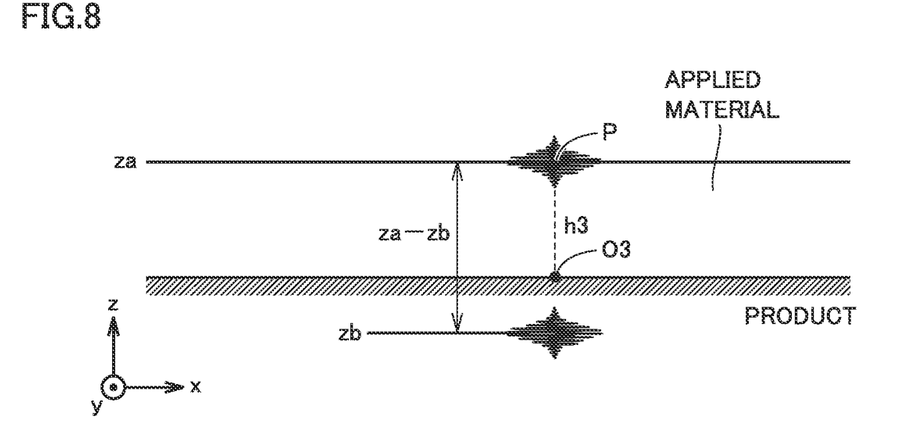
FIG. 8 is a diagram for illustrating a method of measuring a film thickness of an applied material.

Refractive index n calculated as described above is stored in control computer 11 and the film thickness of the transparent material in the actual product is measured by using stored refractive index n. Specifically, as shown in FIG. 8, height za of the front surface, at a prescribed position P, of the transparent material applied onto the substrate of the product, and height zb of the back surface at a position O3 corresponding to position P are measured based on the peak position of the interference light. Using refractive index n stored in control computer 11, an actual film thickness h3 of the applied material in this case can be calculated in accordance with the following formula (6):

$$h3=|za-zb|/n \qquad (6).$$

By determining whether or not film thickness h3 calculated as described above is within a prescribed tolerance, the presence or absence of poor application can be determined.

The film thickness may be measured at a plurality of locations for each object to be measured. When there are a plurality of objects to be measured on the substrate, measurement may be performed on all of the objects, or measurement may be performed on only a part of the objects.

Figure 9:
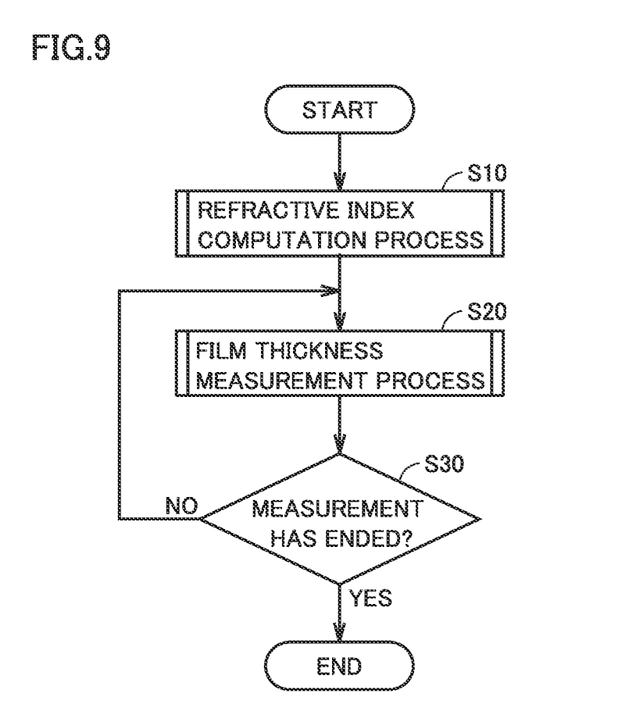
FIG. 9 is a flowchart showing an overall process of film thickness measurement in the present embodiment.

FIG. 9 is a flowchart showing an overall process of film thickness measurement in the present embodiment. Referring to FIG. 9, first, in step (hereinafter, abbreviated as "S") 10, a refractive index computation process is performed in control computer 11 and the calculated refractive index is stored in control computer 11. As described above, this process may be performed using the material applied onto the test substrate, or may be performed using the material applied onto the substrate of the actual product.

Thereafter, in S20, using the above-described method, a film thickness measurement process is performed on the material applied onto the actual product. For example, in S20, the film thicknesses of a plurality of materials applied onto one substrate are measured and it is determined for each material whether an application state is normal or abnormal. The result of determination is stored in control computer 11.

When film thickness measurement for the material to be measured is completed, the process proceeds to S30, where it is determined whether or not the overall process of film thickness measurement has ended. For example, it is determined whether film thickness measurement for all substrates in a target lot has ended or film thickness measurement for the prescribed operation time (morning, afternoon or one day) has ended.

When the overall process of film thickness measurement is not completed (NO in S30), the process returns to S20 and film thickness measurement is performed on the next substrate to be measured. On the other hand, when the overall process of film thickness measurement is completed (YES in S30), the film thickness measurement process ends.

Figure 10:
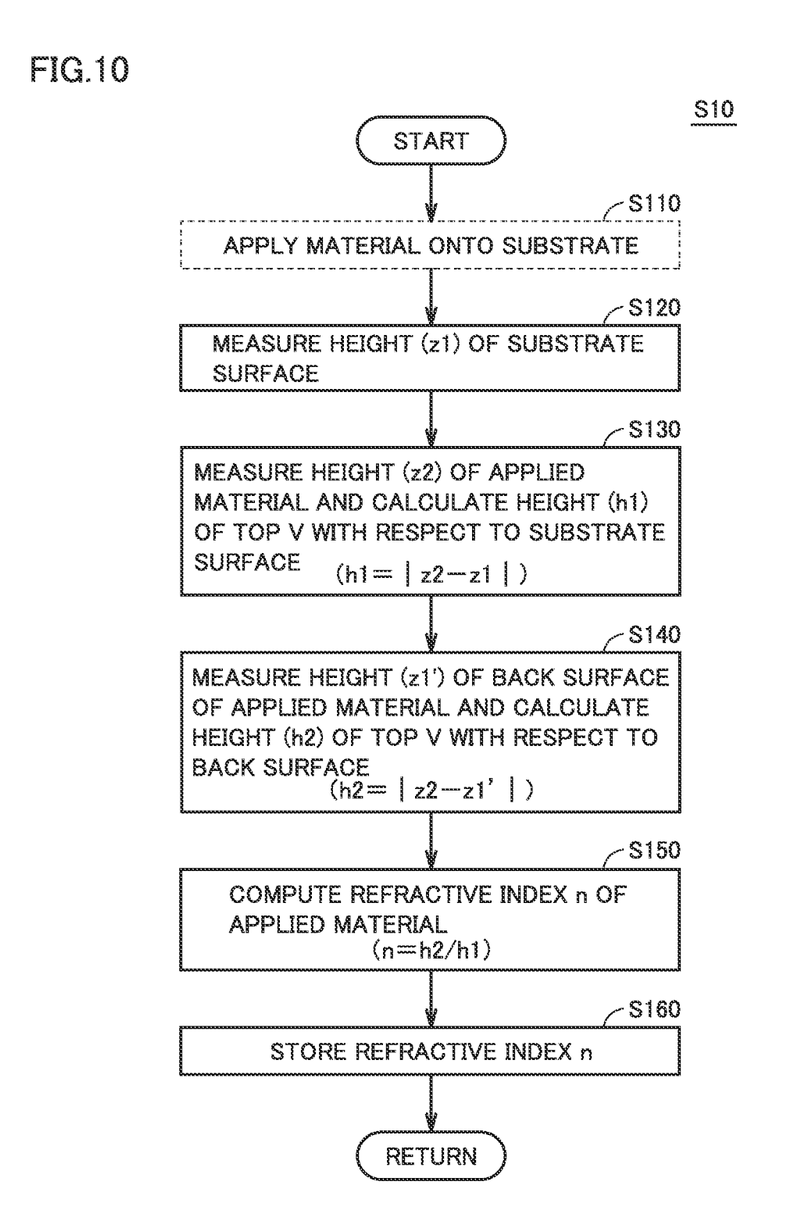
FIG. 10 is a flowchart for illustrating the details of a refractive index computation process in S10 in FIG. 9.

FIG. 10 is a diagram for illustrating the details of the refractive index computation process in step S10 in FIG. 9.

Referring to FIG. 10, first, in S110, control computer 11 controls application mechanism 5 to apply the transparent material to a prescribed position on the substrate placed on Y stage 10. As described above, the application of the material in this case may be application to the test substrate for measuring the refractive index, or may be application to the substrate of the actual product.

Next, in S120, control computer 11 moves X stage 9 and Y stage 10 to thereby locate observation optical system 2 at the position where the transparent material is not applied, as described with reference to FIG. 6. Then, control computer 11 measures height z1 of the substrate surface at this position, based on the peak position of the interference light.

Thereafter, in S130, control computer 11 moves X stage 9 and Y stage 10 to the position close to the top of the applied material and measures height z2 of the front surface of the transparent material based on the peak position of the interference light. Then, based on measured height z2 of the front surface of the applied material and height z1 of the substrate surface measured in S120, control computer 11 calculates height h1 of the front surface of the applied material with respect to the substrate surface in accordance with the formula (3) above.

In S140, control computer 11 measures height z1' of the back surface of the applied material at the same X-Y coordinate position as that in S130, based on the peak position of the interference light. Then, based on height z2 of the front surface of the applied material measured in S130 and height z1' of the back surface of the applied material, control computer 11 calculates height h2 of the front surface with respect to the back surface of the applied material in accordance with the formula (4) above.

Thereafter, in S150, based on height h1 of the front surface of the applied material with respect to the substrate surface measured in S130 and height h2 of the front surface with respect to the back surface of the applied material calculated in S140, control computer 11 computes refractive index n of the transparent material in accordance with the formula (5) above. Computed refractive index n is stored in a memory (not shown) included in control computer 11.

Figure 11:
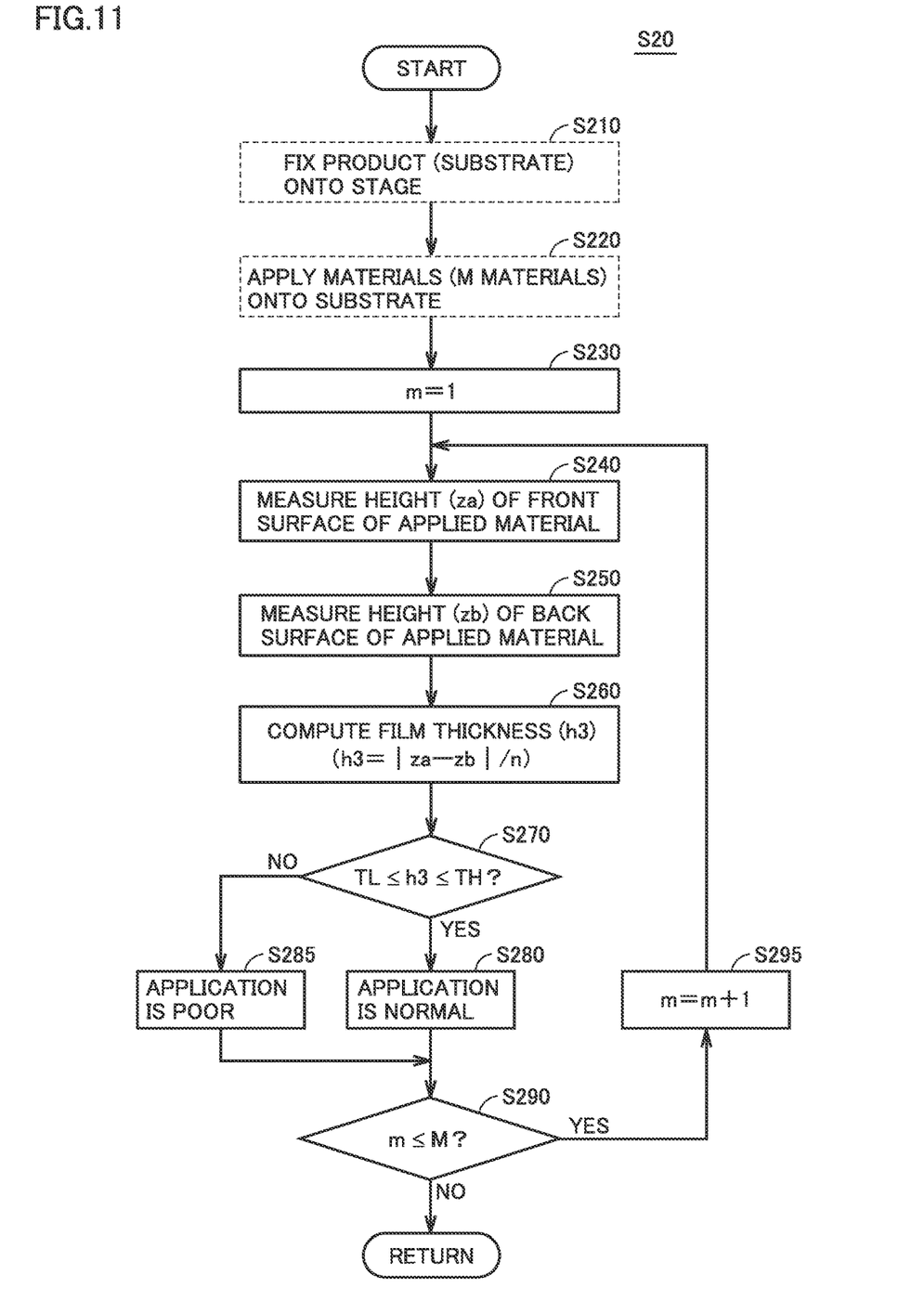
FIG. 11 is a flowchart for illustrating the details of a film thickness measurement process in S20 in FIG. 9.

FIG. 11 is a flowchart for illustrating the details of the film thickness measurement process in S20 in FIG. 9.

Referring to FIG. 11, in S210, the product (substrate) onto which the transparent material is to be applied is placed (fixed) on Y stage 10. This step may be performed by an operator, or may be performed by a conveyance apparatus (not shown) such as a robot arm. When computation of the refractive index in S10 in FIG. 9 is performed using the applied material on the actual product, and subsequent to computation of the refractive index, film thickness measurement is performed on the applied material on the same substrate, S210 may be omitted.

In S220, control computer 11 controls application mechanism 5 to apply the transparent material to predetermined positions (e.g., M positions) on the substrate.

When application of the transparent material is completed, control computer 11 sets an index m at 1 and starts film thickness measurement of an initial applied material of the M applied materials in S230.

In S240, control computer 11 locates observation optical system 2 at the position of the applied material to be measured, with the substrate remaining fixed onto Y stage 10, and measures height za of the front surface of the applied material based on the peak position of the interference light. Thereafter, in S250, control computer 11 measures height zb of the back surface of the applied material based on the peak position of the interference light.

In S260, based on the height (za) of the front surface and the height (zb) of the back surface of the measured applied material and refractive index n stored in S10, control computer 11 computes film thickness h3 of the applied material in accordance with the formula (6) above.

In S270, control computer 11 determines whether or not calculated film thickness h3 is within a predetermined tolerance (lower limit: TL, upper limit: TH) (TL≤h3≤TH).

When film thickness h3 is within the tolerance (YES in S270), the process proceeds to S280, where control computer 11 determines that an amount of the applied material is normal, and stores the result of determination in the internal memory. On the other hand, when film thickness h3 is outside the tolerance (NO in S270), the process proceeds to S285, where control computer 11 determines that the amount of the applied material is poor, and stores the result of determination in the internal memory.

Thereafter, in S290, control computer 11 determines whether or not index m is not more than the number M of the materials to be measured on the substrate (m≤M). In other words, control computer 11 determines whether or not the materials to be measured remain on the substrate.

When index m is not more than M (YES in S290), the process proceeds to S295, where control computer 11 increments index m by 1 (m=m+1), returns the process to S240 and performs film thickness measurement of the next material to be measured.

When index m is greater than M (NO in S290), control computer 11 determines that the materials to be measured do not remain on the substrate, returns the process to the routine in FIG. 9 and performs S30.

Although not shown, the operator is notified of the result of determination in S270. When it is determined that the application is poor, the operator, for example, corrects the amount of the applied material in the next step, based on the result of determination.

As described with reference to FIGS. 9 to 11, prior to film thickness measurement, the refractive index is calculated and stored by using the actually-applied material, and film thickness measurement is performed on the applied material to be measured in the actual product by using the stored refractive index. Thus, the accuracy of film thickness measurement can be enhanced without excessively increasing the film thickness measurement time. That is, the film thickness of the transparent material applied onto the substrate surface can be measured at high speed and with a high degree of precision.

[Modification]

The foregoing embodiment has been described in connection with the configuration in which the step of applying the material and the step of measuring the film thickness are performed by one microscopic application apparatus. However, the method of measuring the film thickness according to the present embodiment does not necessarily need to be performed by the apparatus including the application step, and may be applied to a dedicated measuring apparatus that can perform only film thickness measurement.

Figure 12:
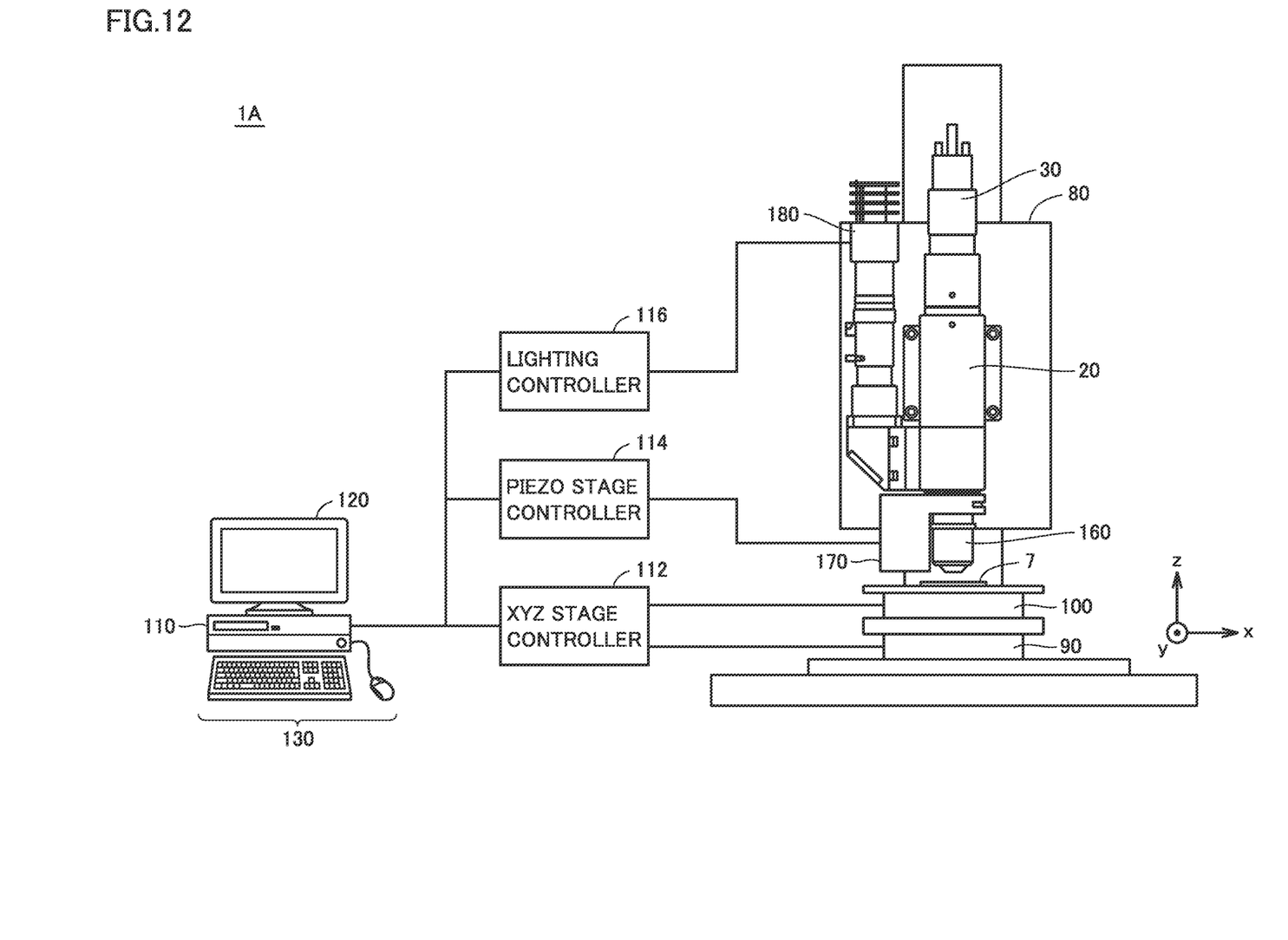
FIG. 12 is a schematic configuration diagram of a film thickness measurement apparatus alone according to the present embodiment.

FIG. 12 is a schematic configuration diagram of a film thickness measuring apparatus 1A according to a modification of the embodiment. In film thickness measuring apparatus 1A, a mechanism for applying a material is not provided and only devices required for film thickness measurement are provided. Film thickness measuring apparatus 1A is used as, for example, a post-process of the application apparatus having only the application mechanism.

Referring to FIG. 12, film thickness measuring apparatus 1A includes a head portion composed of observation optical system 20, CCD camera 30, an interference objective lens 160, a piezo stage 170, and a light source 180. Film thickness measuring apparatus 1A further includes a Z stage 80 configured to move the head portion in the vertical direction (Z-axis direction) relative to substrate 7 to be measured, a Y stage 100 configured to have substrate 7 mounted thereon and move substrate 7 in the Y-axis direction, and an X stage 90 configured to have Y stage 100 mounted thereon and move Y stage 100 in the X-axis direction. Film thickness measuring apparatus 1A further includes a control computer 110, a monitor 120 configured to display an image and the like taken by CCD camera 30, and an operation panel (such as a keyboard and a mouse) through which a command from an operator is input to control computer 110.

X stage 90, Y stage 100 and Z stage 80 are controlled by an XYZ stage controller 112 based on a command from control computer 110. Light source 180 is controlled by a lighting controller 116 based on a command from control computer 110.

Piezo stage 170 is provided between observation optical system 20 and interference objective lens 160. Piezo stage 170 is controlled by a piezo stage controller 114 based on a command from control computer 110, and moves interference objective lens 160 in the Z-axis direction. Piezo stage 170 can be positioned with a higher degree of precision than Z stage 80. The position in the Z-axis direction is specified based on the position of piezo stage 170 and the position of Z stage 80.

In film thickness measuring apparatus 1A in FIG. 12, the function of the devices similar to those of microscopic application apparatus 1 in FIG. 1 is basically the same, and thus, description thereof will not be repeated.

Film thickness measurement using film thickness measuring apparatus 1A shown in FIG. 12 can produce the effect similar to that of the above-described embodiment by performing the process similar to the process described with reference to FIGS. 9 to 11, except for the step of applying the material onto the substrate in FIGS. 10 and 11 (S110, S220).

It should be understood that the embodiment disclosed herein is illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 microscopic application apparatus; 1A film thickness measuring apparatus; 2, 20 observation optical system; 2a observation lens barrel; 3, 30 camera; 3a imaging surface; 4 cutting laser device; 5 application mechanism; 6 light source for curing; 7 substrate; 8, 80 Z stage; 9, 90 X stage; 10, 100 Y stage; 11, 110 control computer; 12, 120 monitor; 13 operation panel; 15 movable plate; 15a through hole; 16, 39, 160 interference objective lens; 17 application unit; 18 application needle; 19 tank; 31 lens; 32 reference mirror; 33 beam splitter; 34 incident light source; 35 filter switching device; 36 filter; 37 half mirror; 38 image-forming lens; 112 XYZ stage controller; 114 piezo stage controller; 116 lighting controller; 170 piezo stage; 180 light source.

The invention claimed is:

1. A measuring apparatus configured to measure a film thickness of an object of a transparent material applied onto a substrate surface, the measuring apparatus comprising:
    a light source configured to emit white light;
    an objective lens configured to separate the white light emitted from the light source into two beams, irradiate the object with one of the two beams and irradiate a reference surface with the other beam, and cause interference between light reflected from the object and light reflected from the reference surface, to thereby obtain interference light;
    an imaging device configured to take an image of the interference light obtained by the objective lens;
    a positioning device configured to move the objective lens in an optical axis direction relative to the object; and
    a control device configured to control the light source, the imaging device and the positioning device, and measure a height of the object based on a peak intensity of the interference light in the image taken by the imaging device,
    a first object being applied onto a first substrate surface, a second object being applied onto a second substrate surface,
    the control device being configured to:
        calculate a refractive index of the transparent material, based on a first relative height of a front surface of the first object with respect to the first substrate surface at a position where the first object is not applied and a second relative height of the front surface of the first object with respect to a back surface of the first object; and
        measure a film thickness of the second object, using a third relative height of a front surface of the second object with respect to a back surface of the second object and the calculated refractive index.

2. The measuring apparatus according to claim 1, wherein the first substrate surface and the second substrate surface are on different substrates.

3. The measuring apparatus according to claim 1, wherein the first substrate surface and the second substrate surface are on the same substrate.

4. An application apparatus comprising:
an application mechanism configured to apply the transparent material onto the substrate surface; and
the measuring apparatus as recited in claim 1.

5. The application apparatus according to claim 4, wherein
the application mechanism includes an application needle,
the transparent material adheres to a tip portion of the application needle, and
the tip portion of the application needle or the transparent material adhering to the tip portion of the application needle is brought into contact with the substrate surface, to thereby apply the transparent material onto the substrate surface.

6. The application apparatus according to claim 5, wherein
the control device is configured, after the transparent material is applied onto the second substrate surface by the application mechanism, to measure the film thickness of the second object, with the substrate remaining fixed.

7. The application apparatus according to claim 4, wherein
the control device is configured, after the transparent material is applied onto the second substrate surface by the application mechanism, to measure the film thickness of the second object, with the substrate remaining fixed.

8. A method of measuring a film thickness of an object of a transparent material applied onto a substrate surface,
a first object being applied onto a first substrate surface,
a second object being applied onto a second substrate surface,
the method comprising:
measuring a first relative height of a front surface of the first object with respect to the first substrate surface at a position where the first object is not applied;
measuring a second relative height of the front surface of the first object with respect to a back surface of the first object;
calculating a refractive index of the transparent material, based on the first relative height and the second relative height; and
measuring a film thickness of the second object, using a third relative height of a front surface of the second object with respect to a back surface of the second object and the calculated refractive index.

9. The method according to claim 8, wherein
the first to third relative heights are measured using white-light interferometry.

* * * * *

UNITED STATES PATENT AND TRADEMARK OFFICE
CERTIFICATE OF CORRECTION

PATENT NO. : 10,845,185 B2
APPLICATION NO. : 16/473600
DATED : November 24, 2020
INVENTOR(S) : Hiroaki Ohba et al.

It is certified that error appears in the above-identified patent and that said Letters Patent is hereby corrected as shown below:

On the Title Page

Item (54) and in the Specification, Column 1, Line 1-4, Title:
MEASURING APPARATUS AND METHOD FOR MEASURING FILM THICKNESS USING RELATIVE HEIGHTS IN COMBINATION WITH REFRACTIVE INDEX Should read as:
MEASURING APPARATUS, APPLICATION APPARATUS, AND METHOD OF MEASURING FILM THICKNESS Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*